June 10, 1969    T. A. BENTLEY ETAL    3,448,814
GRADER BUCKET CONSTRUCTION
Filed Sept. 16, 1965

INVENTORS.
THOMAS A. BENTLEY and
CARL D. JACKSON
BY
Lockwood, Woodard, Smith & Weikart
Attorneys

United States Patent Office 3,448,814
Patented June 10, 1969

3,448,814
GRADER BUCKET CONSTRUCTION
Thomas A. Bentley, North Little Rock, Ark., and Carl D. Jackson, Fortville, Ind., assignors to C. D. Jackson Manufacturing, Inc., Fortville, Ind., a corporation of Indiana
Filed Sept. 16, 1965, Ser. No. 487,809
Int. Cl. A01b 49/02
U.S. Cl. 172—146                    2 Claims

ABSTRACT OF THE DISCLOSURE

Landscaping apparatus including a bucket having a lower scraping edge at the rear of the bucket, plow blades at the front of the bucket, raking tines between the scraping edge and the plow blades, and a grooved roller mounted to the rear of the bucket rear. The apparatus has a back fill blade mounted thereon and includes means for selectively positioning the raking tines and the roller into and out of operating position.

---

The present invention relates to a grader bucket construction particularly adapted for landscaping and leveling of ground around a residence prior to grass seeding thereof.

The present conventional procedure for preparing ground for grass seeding involves a number of operations many of which are accomplished by men on foot using hand tools. For example, after the ground has been broken up by plowing, men are used to rake the ground for breaking up big lumps of dirt and smoothing the surface of the ground. In some cases men push rollers across the ground to further smooth the surface. Lastly, further raking may be done with hand tools to provide recesses in the soil for the seed. Consequently, an important object of the present invention is to provide a grader bucket arrangement which eliminates much of the manpower normally used in landscaping and preparing ground for grass seed.

A further object of the invention is to provide an improved grader bucket arrangement.

Related objects and advantages will become apparent as the description proceeds.

One specific embodiment of the present invention might include a bucket having an open bottom and top, said bucket having a rear having a forward recessed face and a straight lower scraping edge, said bucket having a pair of sides extending forwardly from said rear, said sides having straight lower edges, a cross member fixed to said sides at the upper forward portion of said bucket, said cross member extending in generally parallel relation to said rear, a plurality of plow blades secured to said cross member and depending therefrom, said plow blades curving downwardly and forwardly beyond the lower edges of said side members and being equally spaced along the forward portion of said bucket, a plurality of raking tines, a mounting member, said plurality of tines being equally spaced along said mounting member and fixed thereto, said tines being more closely spaced than said plow blades, said mounting member being positioned rearwardly of said plow blades and swingably mounted at its opposite ends upon said sides for swinging movement between a first position wherein said tines project downwardly below the lower edges of said sides and a second position wherein said tines are raised above the lower edges of said sides, toggle spring means connected to said mounting member and to said sides and selectively maintaining said tines in said first and second positions, a roller extending parallel to said rear, said roller having a diamond shaped pattern in the periphery thereof, a pair of roller mounting members rotatably mounting said roller at distal ends of said roller mounting members and swingably secured to said bucket rear at the proximal ends of said roller mounting members, said roller being swingable to a first downward position located rearwardly of said bucket rear and to a second upward position resting upon said bucket, toggle spring means connected to said roller mounting members and to said bucket and selectively maintaining said roller in said downward and upward positions, and a flat blade fixed to said bucket rear and projecting downwardly and rearwardly, said blade having a lower scraping edge which is straight and parallel to said rear lower edge.

The full nature of the invention will be understood from the accompanying drawings and the following description and claims.

Figures 1, 2:
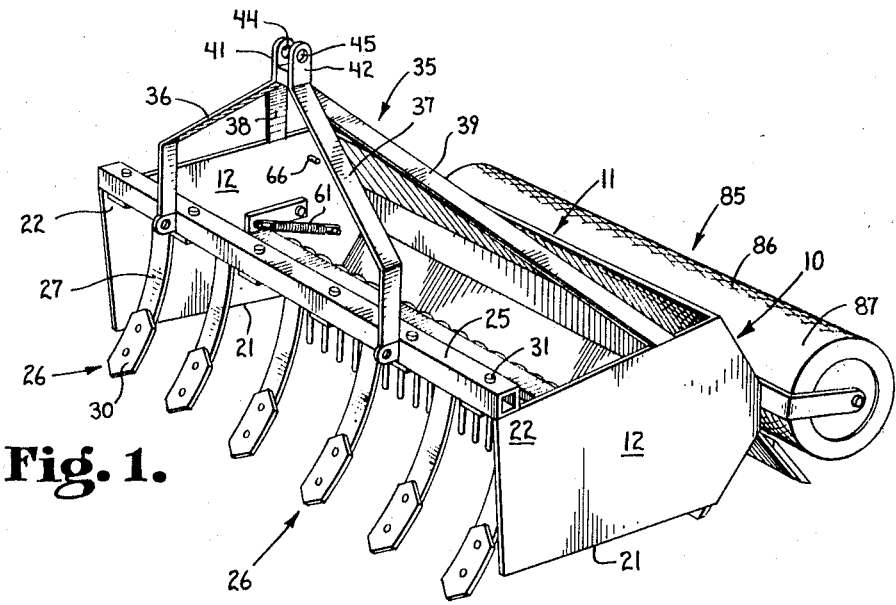
FIG. 1 is a perspective view of a greater bucket construction embodying the present invention.
FIG. 2 is an enlarged vertical section taken front to rear of the construction illustrated in FIG. 1.

For the purposes of promoting an understanding of the prniciples of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a grader bucket arrangement including a grader bucket 10 which has a rear 11 and a pair of sides 12 which are fixed to the rear 11 and project forwardly therefrom. The rear 11 has a recessed forward face 15, said recess being defined by a central vertical portion 16, an upper portion 17 which slopes upwardly and forwardly, and a lower blade portion 18 which extends downwardly and forwardly and has a straight lower scraping edge 20. Each of the sides 12 also has a straight lower edge 21.

Fixed to the sides 12 at their upper forward portion 22 is a cross bar 25 which may have a hollow rectangular cross section as shown in FIG. 2. The cross bar as cross member 25 has fixed thereto at equal intervals therealong a plurality of depending plow blades 26. Each of the plow blades includes a shank portion 27 and a blade per se 30 connected to the distal end of the shank portion. Each of the blades 26 curves downwardly and forwardly and extends beneath the lower surfaces of the sides 12. Bolts 31 may be used to fix the shank portions 27 of the blades to the cross bar or cross member 25.

The grader bucket construction is connected to a tractor or prime mover by means of a coupling assembly 35 which includes four members 36, 37, 38 and 39. The members 36 and 37 are fixed to the cross member 25 while the members 38 and 39 are fixed to the respective sides 12. The members 36 and 37 include upstanding portions 41 and 42 between which is welded the members 38 and 39. The upstanding portions 41 and 42 have respectively therethrough apertures 44 and 45 which receive a pin for coupling the grader bucket construction to a tractor.

A raking tine mounting member 50 is swingably mounted by means of mounting elements 51 for swinging about an axis 52. Each of the sides 12 receives a pin 55 which projects inwardly of the grader bucket construction and pivotally mounts a respective one of the members 51. Fixed to the raking tine mounting member 50 are a plurality of raking tines 56 which are equally spaced along the length of the member 50 at much closer intervals than the spacing of the plow blades 26 along the cross bar 25. As best illustrated in FIG. 2, the raking tines 56 curve from their proximal ends 57 and are straight at their distal ends 60. When the raking tines 56 are in the solid line position of FIG. 2, the tines project downwardly substantially beyond the lower edges 21 of the sides 12 of the grader bucket construction.

A pair of tension springs 61 are fixed at one end to a respective one of the members 51 and at the other end to a respective one of the sides 12. The springs 61 function to hold the raking tine assembly 62 in the solid line position of FIG. 2 or in the dotted line position of FIG. 2. The solid line position of FIG. 2 is determined by a pair of limiting members 65 which project inwardly from the sides 12 and limit the movement of the spring tine mounting element 50. The dotted line position of FIG. 2 is determined by engagement of the members 51 with the inwardly projecting limit stops 66, each of which is secured to a respective one of the sides 12. It can be appreciated that when the raking tines 56 are in the solid line position of FIG. 2, the grader bucket construction will function to rake the ground over which it is being pulled. On the other hand, when the raking tines are in the dotted line position of FIG. 2, no raking will be effected.

The grader bucket construction of the present invention is capable of not only moving dirt forwardly within the recessed forward face 15 of the rear 11 but is also capable of moving dirt rearwardly, for example, for the purpose of filling in dirt near fences or near a residence or the like. This latter function is accomplished by means of the downwardly and rearwardly extending blade assembly 75 which includes a shank portion 76 fixed to the rear 11 and a blade per se portion 77 which has a straight lower edge 80 parallel to and spaced rearwardly of the lower edge 20 of the blade portion 18.

Also mounted upon the rear 11 of the grader bucket construction is a roller 85 which has a diamond shaped pattern 86 in the external periphery 87 thereof. The diamond shaped pattern 86 functions to leave recesses in the ground being rolled to receive grass seed. The roller 85 is rotatably mounted at its opposite ends upon roller-mounting members 90 which are swingably secured to the bucket rear 11 by means of pins 91 and rearwardly extending members 92 fixed to the rear 11. It will be noted that the roller 85 extends substantially the complete width of the grader bucket construction. A pair of toggle springs 92 are provided for holding the roller 85 in the illustrated upward position or for urging it to a downward operating position wherein it rolls along the ground behind the grader bucket construction. Each of the tension springs 92 is secured at one end to a respective roller-mounting member 90 and at the other end to a respective member 92.

In operation the grader bucket construction of the present invention is pulled across the ground by means of a suitable tractor or prime mover connected to the coupling assembly 35. The position of the grader bucket construction relative to the ground is generally determined by the scraper blade edge 20 and by the lower edges 21 of the sides 12. Thus the plow blades 26 engage the earth or ground and cause a plowing action. The raking tines when in the illustrated downward position of FIG. 2 simultaneously produce a raking action breaking up the relatively large lumps and clods produced by the plow blades 26. The action of the raking tines 56 is followed up by the scraping and smoothing action of the blade edge 20. Finally the roller 85 follows along behind the blade edge 20 and produces a final smoothing action also accompanied by the formation of diamond shape grooves for reception of grass seed. When it is desired to move dirt in a rearward direction, the raking tines 60 can be raised to the dotted line position and the roller 85 can be swung upwardly to the illustrated solid line position of FIG. 2. The grader bucket construction is then moved rearwardly by rearward movement of the tractor or prime mover. It will be evident from the above description that the present invention provides improved grader bucket construction or arrangement which eliminates much of the manpower normally used or needed in landscaping and in preparing ground for grass seed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Landscaping apparatus comprising a bucket having an open bottom and top, said bucket having a rear having a forward recessed face and a straight lower scraping edge, said bucket having a pair of sides extending forwardly from said rear, said sides having lower edges, a cross member fixed to said sides at the upper forward portion of said bucket, said cross member extending in generally parallel relation to said rear, a plurality of plow blades secured to said cross member and depending therefrom, said plow blades curving downwardly and forwardly beyond the lower edges of said side members and being equally spaced along the forward portion of said bucket, a plurality of raking tines, a mounting member, said plurality of tines equally spaced along said mounting member and fixed thereto, said tines being more closely spaced than said plow blades, said mounting member being positioned rearwardly of said plow blades and swingably mounted at its opposite ends upon said sides for swinging movement between a first position wherein said tines project downwardly below the lower edges of said sides and a second position wherein said tines are raised above the lower edges of said sides, a roller extending parallel to and mounted on said bucket rear, said roller being positioned rearwardly of said rear and having a recessed pattern in the periphery thereof suitably shaped to leave recesses in the ground for grass seed, a pair of roller mounting members rotatably mounting said roller at distal ends of said roller mounting members and swingably secured to said bucket rear at the proximal ends of said roller mounting members, said roller being swingable to a first downward position located rearwardly of said bucket rear and to a second upward position resting upon said bucket.

2. Landscaping apparatus comprising a bucket having an open bottom and top, said bucket having a rear having a forward recessed face and a straight lower scraping edge, said bucket having a pair of sides extending forwardly from said rear, said sides having straight lower edges, a cross member fixed to said sides at the upper forward portion of said bucket, said cross member extending in generally parallel relation to said rear, a plurality of plow blades secured to said cross member and depending therefrom, said plow blades curving downwardly and forwardly beyond the lower edges of said side members and being equally spaced along the forward portion of said bucket, a plurality of raking tines, a mounting member, said plurality of tines being equally spaced along said mounting member and fixed thereto, said tines being more closely spaced than said plow blades, said mounting member being positioned rearwardly of said plow blades and swingably mounted at its opposite ends upon said sides for swinging movement between a first position wherein said tines project downwardly below the lower edges of said sides and a second position wherein said tines are raised above the lower edges of said sides, toggle spring means connected to said mounting member and to said sides and selectively maintaining said tines in said first and second positions, a roller extending parallel to said rear, said roller having a diamond shaped pattern in the periphery thereof, a pair of roller mounting members rotatably mounting said roller at distal ends of said roller mounting members and swingably secured to said bucket rear at the proximal ends of said roller mounting members, said roller being swingable to a first downward position located rearwardly of said bucket rear and to a second upward position resting upon said bucket, toggle spring means connected to said roller mounting members and to said bucket and selectively maintaining said roller in said downward and upward positions, and a flat blade fixed to said bucket rear and projecting downwardly and rearwardly, said blade having a lower scraping edge which is straight and parallel to said rear lower edge.

References Cited

UNITED STATES PATENTS

| | | | |
|---|---|---|---|
| Re. 68,110 | 8/1867 | Prutzman | 172—150 X |
| 2,736,252 | 2/1956 | Latshaw | 172—198 X |
| 3,069,791 | 12/1962 | French | 37—145 |
| 3,083,652 | 4/1963 | Brettrager et al. | 172—170 X |

ABRAHAM G. STONE, *Primary Examiner.*

STEPHEN C. PELLEGRINO, *Assistant Examiner.*

U.S. Cl. X.R.

172—170